United States Patent

[11] 3,627,756

| [72] | Inventor | Paul D. Klimstra |
| | | Northbrook, Ill. |
| [21] | Appl. No. | 31,370 |
| [22] | Filed | Apr. 23, 1970 |
| [45] | Patented | Dec. 14, 1971 |
| [73] | Assignee | G. D. Searle & Co. |
| | | Chicago, Ill. |

[54] N-DIALKYLAMINOALKYL-N-(2β,19-EPOXY-5α-ANDROSTAN-17β-YL)AMINES/FORMAMIDES AND 3α-HALO DERIVATIVES THEREOF
9 Claims, No Drawings

[52] U.S. Cl. .................................................. 260/239.55R, 424/241
[51] Int. Cl. ........................................................ C07c 173/00
[50] Field of Search ........................................... Machine Searched Steroids

[56] References Cited
UNITED STATES PATENTS

| 3,033,855 | 5/1962 | Berg et al. .................. | 260/239.5 |
| 3,033,861 | 5/1962 | Kerwin et al. .................. | 260/239.55 |
| 3,033,873 | 5/1962 | Pinson et al. .................. | 260/397.45 |

OTHER REFERENCES

Counsell et al. J. Med. Pharm. Chem. 5 pg. 1224– 1233 (1962)

Primary Examiner—Henry A. French
Attorneys—John M. Brown, John J. Kolano, Elliot N. Schubert, Lowell C. Bergstedt, Sybil Meloy, Walter C. Ramm and Helmuth A. Wegner ABSTRACT: 2β, 19-Epoxy-17-keto steroids are contacted with a dialkylaminoalkylamine to afford the corresponding 17-ylimines, which are reduced to the 17β-ylamines and the latter amines are converted to the corresponding formamides by reaction with a formylating agent. These novel compounds exhibit valuable pharmacological properties, e.g. antiulcerogenic, antimicrobial and anti-inflammatory.

N-DIALKYLAMINOALKYL-N-(2β,19-EPOXY-5α-ANDROSTAN-17β-YL)AMINES/FORMAMIDES AND 3α-HALO DERIVATIVES THEREOF

The present invention is concerned with novel steroidal derivatives of the androstane family and, more particularly, with N-dialkylaminoalkyl-N-(2β,19-epoxy-5α-androstan-17β-yl)amines/formamides and 3α-halo derivatives thereof as represented by the following structural formula

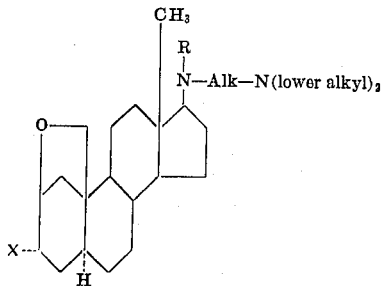

wherein R is hydrogen or a formyl radical, Alk is a lower alkylene radical and X represents hydrogen or a bromo or a chloro radical.

The lower alkylene radicals encompassed by the foregoing formula are typified by methylene, ethylene, trimethylene, tetramethylene, pentamethylene and the branched-chain isomers thereof.

Examples of the lower alkyl radicals depicted in that formula are methyl, ethyl, propyl, butyl, pentyl, hexyl, heptyl and the branched-chain groups isomeric therewith.

The compounds of the invention are conveniently manufactured by utilizing as starting materials 17-keto substances of the following structural formula

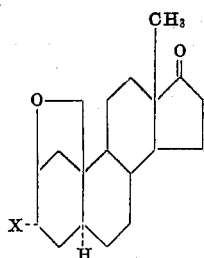

wherein X has the same meaning as hereinbefore defined. The reaction of those substances with a dialkylaminoalkylamine, preferably in the presence of an acid catalyst, affords the corresponding 17-ylimines. A specific example of that process is the reaction of 3α-chloro-2β,19-epoxy-5α-androstan-17-one with 2-diisopropylaminoethylamine in the presence of p-toluenesulfonic acid in refluxing benzene solution to afford N-(2-diisopropylaminoethyl)-N- 3α-chloro-2β,19-epoxy-5α-androstan-17-yl)imine. The imines produced by the latter process are converted to the amines of the present invention by use of a metallic hydride reducing agent such as lithium aluminum hydride, sodium borohydride or lithium tri-(tertiary-butoxy) aluminum hydride or, alternatively, by catalytic hydrogenation, preferably with a platinum oxide catalyst. The aforementioned N-(2-diisopropylaminoethyl)-N-(3α-chloro-2β,19-epoxy-5α-androstan-17-yl)imine, for example, is stirred in methanol solution with sodium borohydride to yield N-(2-diisopropylaminoethyl)-N-(3α-chloro-2β,19-epoxy-5α-androstan-17β-yl)amine.

The formamides of the present invention are obtained when the instant amines are allowed to react with a formylating agent. Formic anhydride—conveniently prepared in situ from formic acid and acetic anhydride—is a preferred reagent. The reaction of N-(2-diisopropylaminoethyl-N-(3α-chloro-2β,19-epoxy-5α-androstan-17β-yl)amine, for example, with a mixture of formic acid and acetic anhydride thus affords N-(2-diisopropylaminoethyl)-N-(3α-chloro-2β,19-epoxy-5α-androstan-17β-yl)formamide.

Equivalent to the amines of this invention are the corresponding nontoxic acid-addition and quaternary ammonium salts as exemplified by the citrate, maleate, tartrate, succinate, ascorbate, gluconate, lactate, oxalate, glycolate, sulfate, phosphate, hydrochloride, hydrobromide, methochloride, ethochloride, methosulfate, ethosulfate, methiodide, ethiodide, etc.

The compounds of this invention are useful in consequence of their valuable pharmacological properties. They possess, for example, antiinflammatory and antiulcerogenic activity. They display, in addition, antimicrobial activity as evidenced by their capacity to inhibit the growth of bacteria such as *Erwinia* sp., fungi such as *Trichophyton mentagrophytes* and *Verticillium albo-atrum* and algae such as *Chlorella vulgaris*.

The assay used to detect the antiinflammatory activity of the instant compounds is described as follows:

A group of intact Sprague-Dawley male rats weighing 130–150 grams is adjusted to laboratory conditions for 3–8 days, then is inoculated intradermally, under ether anesthesia, on the proximal end of the tail with 0.05 ml. of a paraffin oil solution containing 0.6 mg. of killed *Mycobacterium butyricum* and 1 mg. of digitonin. Digitonin is used as an additive in order to insure the maximal response from the *Mycobacterium butyricum*. On the day of inoculation the animals are treated either subcutaneously or intragastrically with the selected dose of the test compound dissolved or suspended in saline or corn oil and treatment is continued for a total of 15 days. On the day following the final treatment the animals are sacrificed and the circumferences of the two rear ankle joints are determined by volume displacement with a plethysmograph. A compound is rated active if it causes a significant decrease ($P \leq 0.05$) in the volume displacement of the hind paws of treated animals as compared to control animals treated in the same manner save for omission of the test compound.

The antiulcerogenic activity of these compounds is apparent from their capacity to inhibit ulceration in the Shay rat. Details of that assay are disclosed in U.S. Pat. No. 3,459,758, issued Aug. 5, 1969.

The antibacterial property of the compounds of this invention is evidenced by their activity in the following assay:

Nutrient broth (manufactured by Baltimore Biological Laboratories or Difco) is prepared at twice the concentration recommended by the manufacturer, sterilized and inoculated with 2 percent (by volume) of a culture of *Erwinia* sp. Meanwhile the test compound is heated in sterile distilled water at a concentration of 2,000 mcg. per ml. at a temperature of 80° C. for 20 minutes. An equivolume mixture of this compound preparation and the inoculated broth is incubated aerobically at 37° C., then examined grossly for growth of the test organism. The incubation period is 24–48 hours. If growth of the test organism is observed, the compound is considered inactive. If no such growth is observed, the incubated mixture is serially diluted and mixed with an inoculated broth of the same composition as before excepting that the concentration is halved and 1 percent (by volume) of the culture instead of 2 percent is incorporated. Amounts of the latter broth added are such that concentrations of 100, 10 and 1 mcg. of compound per ml. result. The mixtures thus obtained are incubated as before and then examined grossly for growth of the test organism. Potency is expressed as the minimum concentration at which no growth of the test organism is discernible. Controls are provided by concurrent incubations identical with the foregoing except for the absence of the test compound.

Confirmation of the antifungal properties of the compounds of this invention is afforded by their activity in the assay described as follows:

The test compound is dissolved or suspended in melted Sabouraud agar and is held at 80° C. for 20 minutes. Dilutions are made from this preparation in melted Sabouraud agar in order to give concentrations of the test substance of 1,000, 100, 10 and 1 mcg. per ml. in the agar. The agar is permitted to cool and solidify and is then surface inoculated with a suspension of spores of *Trichophyton mentagrophytes* or *Verticillium albo-atrum*. The inoculated media are incubated at room temperature for 6–7 days, then are examined grossly for the presence or absence of growth of the test organism. Control preparations lacking the test compound are employed for comparative purposes. The activity of the compound is reported as mcg. of the compound per ml. of agar which completely prevents visible growth of the test organism.

Evidence for the antialgal property of the instant compounds is obtained from the following assay:

Sterile Bristol medium of two times the normal concentration is inoculated with an aqueous suspension of *Chlorella vulgaris* and 0.5 ml. of that inoculated medium is mixed with 0.5 ml. of a stock solution or suspension of the test compound in sterile distilled water prepared at a concentration of 2 mg. per ml. Serial dilutions are made using single strength Bristol medium, thus affording mixtures having concentrations of 1,000, 100, 10 and 1 mcg./ml. Those inoculated media are incubated at room temperature under artificial light for 4–5 days, then are examined macroscopically for the presence or absence of growth of the organism. The activity of the test compound is reported as the concentration at which no algal growth is observed. A control mixture identical save for omission of the test compound is prepared for comparative purposes.

The invention will appear more fully from the examples which follow. These examples are set forth by way of illustration only and it will be understood that the invention is not to be construed as limited either in spirit or in scope by the details contained therein as many modifications in materials and methods will be apparent from this disclosure to those skilled in the art. In these examples temperatures are given in degrees centigrade. Quantities of materials are expressed in parts by weight except where otherwise noted.

EXAMPLE 1

A mixture containing 4 parts of 3α-bromo-2β,19-epoxy-5α-androstan-17-one, 17 parts of Raney nickel catalyst and 104 parts of ethanol is heated at the reflux temperature for about 5 hours, then is allowed to stand at room temperature for about 16 hours. At the end of that reaction period, the catalyst is removed by filtration and the filtrate is concentrated to dryness by distillation under reduced pressure. The initially oily residue solidifies upon standing and is purified by recrystallization from aqueous ethanol to afford 2β,19-epoxy-5α-androstan-17-one, melting at about 92°–93.5° and displaying an optical rotation, in chloroform, of +48.5°.

EXAMPLE 2

A mixture containing 10 parts of 2β,19-epoxy-5α-androstan-17-one, 6.5 parts of 2-diisopropylamino ethylamine, 1.3 parts of p-toluenesulfonic acid monohydrate and 176 parts of benzene is heated at the reflux temperature for about 16 hours, during which time the water of reaction is removed by means of a water separator. Removal of the solvent by distillation under reduced pressure affords N-(2-diisopropylaminoethyl)-N-(2β,19-epoxy-5α-androstan-17-yl)imine as an oil.

EXAMPLE 3

A mixture containing 15 parts of 3α-chloro-2β,19-epoxy-5α-androstan-17-one, 9 parts of 2-diisopropylaminoethylamine, 1.7 parts of p-toluenesulfonic acid monohydrate and 176 parts of benzene is heated at the reflux temperature for about 16 hours with the water of reaction being removed by means of a water separator. Removal of the solvent by distillation under reduced pressure affords, as an oil, N-(2-diisopropylaminoethyl)-N-(3α-chloro-2β,19-epoxy-5α-androstan-17-yl)imine. This compound is characterized by infrared absorption maxima at about 3.42 and 6.05 microns.

EXAMPLE 4

When an equivalent quantity of 3α-bromo-2β,19-epoxy-5α-androstan-17-one is substituted in the procedure of example 3, there is obtained N-(2-diisopropylaminoethyl)-N-(3α-bromo-2β,19-epoxy-5α-androstan-17-yl)imine.

EXAMPLE 5

To a solution of 18 parts of N-(2-diisopropyl-aminoethyl)-N-(3α-chloro-2β,19-epoxy-5α-androstan-17-yl)imine in 560 parts of methanol is added with stirring, over a period of about 15 minutes, 10 parts of sodium borohydride. Stirring is continued for about 30 minutes longer and the reaction mixture is then diluted with water and cooled at 0°–5°. The precipitate which forms is collected by filtration, then dissolved in acetone and filtered through diatomaceous earth. The crystals which deposit from that solution are collected by filtration, thus affording N-(2-diisopropylaminoethyl)-N-(3α-chloro-2β,19-epoxy-5α-androstan-17β-yl)amine, characterized by an optical rotation of +33.77° in chloroform. This compound is represented by the following structural formula

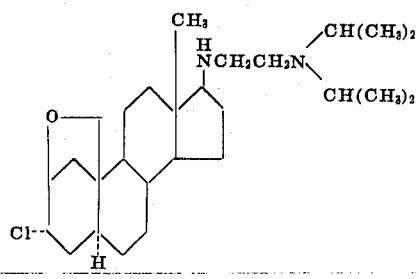

EXAMPLE 6

The substitution of an equivalent quantity of N-(2-diisopropylaminoethyl)-N-(3α-bromo-2β,19-epoxy-5α-androstan-17-yl)imine in the procedure of example 5 results in N-(2-diisopropylaminoethyl)-N-(3α-bromo-2β,19-epoxy-5α-androstan-17β-yl)amine.

EXAMPLE 7

To a solution of 13 parts of N-(2-diisopropylaminoethyl)-N-(2β,19-epoxy-5α-androstan-17-yl)imine in 320 parts of methanol is added with stirring, over a period of about 15 minutes, 7 parts of sodium borohydride. After stirring for an additional 30 minutes, water is added to the reaction mixture and that diluted solution is cooled. The precipitate which results is collected by filtration and washed with water, then purified by recrystallization from acetone, thus yielding N-(2-diisopropylaminoethyl)-N-(2β,19-epoxy-5α-androstan-17β-yl)amine, which displays an optical rotation, in chloroform, of +29°. It is further characterized by the following structural formula

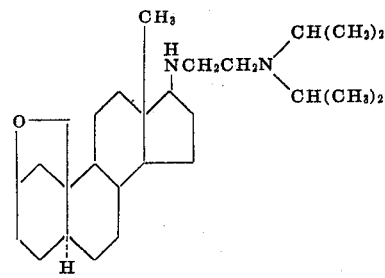

EXAMPLE 8

By substituting an equivalent quantity of 2-diethylaminoethylamine and otherwise proceeding according to the processes described in example 3, there is produced N-(2-diethylaminoethyl)-N-(3αchloro-2β,19-epoxy-5α-androstan-17yl)imine.

EXAMPLE 9

When an equivalent quantity of N-(2-diethylaminoethyl-N-(3α-chloro-2β,19-epoxy-5α-androstan-17-yl)imine is substituted in the procedure of example 5, there is produced N-(2-diethylaminoethyl)-N-(3α-chloro-2β,19-epoxy-5α-androstan-17β-yl)amine.

EXAMPLE 10

The substitution of an equivalent quantity of 3-diethylaminopropylamine in the procedure of example 2 results in N-(3-diethylaminopropyl)-N-(2β,19-epoxy-5α-androstan-17-yl)imine.

EXAMPLE 11

When an equivalent quantity of N-(3-diethylaminopropyl)-N-(2β,19-epoxy-5α-androstan-17-yl)imine is substituted in the procedure of example 7, there is obtained N-(3-diethylaminopropyl)-N-(2β,19-epoxy-5α-androstan-17β-yl)amine.

EXAMPLE 12

A mixture consisting of 49 parts of formic acid and 40 parts of acetic anhydride is prepared and added to 4 parts of N-(2-diisopropylaminoethyl)-N-(3α-chloro-2β,19-epoxy-5α-androstan-17β-yl)amine. The resulting reaction mixture is heated on the steam bath for about 2 hours, then allowed to stand at room temperature for about 90 minutes. The mixture is cooled and neutralized by the addition of aqueous sodium hydroxide, during which time methanol is added to keep the mixture homogeneous. The addition of water results in precipitation of the crude product, which is washed on the filter with water, then dried in air. Purification by recrystallization from ethyl acetate results in N-(2-diisopropylaminoethyl)-N-(3α-chloro-2β,19-epoxy-5β-androstan-17β-yl)formamide. This compound possesses an optical rotation, in chloroform of +9.79° and is characterized further by the following structural formula

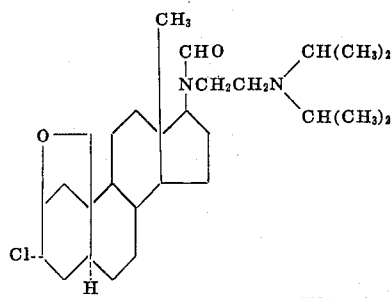

EXAMPLE 13

When an equivalent quantity of N-(2-diethylaminoethyl)-N-(3α-chloro-2β,19-epoxy-5α-androstan-17β-yl)amine is substituted in the procedure of example 12, there is obtained N-(2-diethylaminoethyl)-N-(3α-chloro-2β,19-epoxy-5α-androstan-17β-yl)formamide.

EXAMPLE 14

A mixture of 61 parts of formic acid and 50 parts of acetic anhydride is prepared, then is added to 4.5 parts of N-(2-diisopropylaminioethyl)-N-(2β,19-epoxy-5α-androstan-17β-yl)amine. The resulting reaction mixture is heated at 90°–100° for about 2 hours, then is allowed to stand at room temperature for about 90 minutes. Neutralization of the mixture is effected by the addition of aqueous sodium hydroxide while the mixture is cooled and methanol is added also in order to maintain the homogeneity of the mixture. Dilution of the resulting mixture with water results in precipitation of the solid product. That crude material is collected by filtration, then washed with water and dried in air. Purification by recrystallization from acetone-ethyl acetate results in N-(2-diisopropylaminoethyl)-N-(2β,19-epoxy-5α-androstan-17β-yl)formamide, which exhibits an optical rotation of −5.3° in chloroform and is represented by the following structural formula

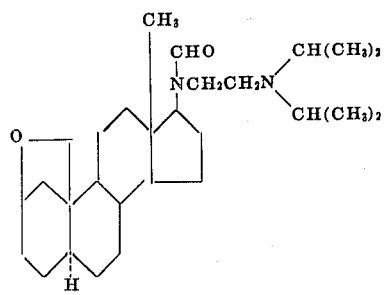

EXAMPLE 15

When an equivalent quantity of N-(2-diisopropylaminoethyl)-N-(3α-bromo-2β,19-epoxy-5α-androstan-17β-yl)amine is substituted in the procedure of example 12, there is produced N-(2-diisopropylaminoethyl)-N-(3α-bromo-2β,19-epoxy-5α-androstan-17β-yl)formamide.

EXAMPLE 16

The substitution of an equivalent quantity of N-(3-diethylaminopropyl)-N-(2β,19-epoxy-5α-androstan-17β-yl)amine in the procedure of example 12 results in N-(3-diethylaminopropyl)-N-(2α,19-epoxy-5α-androstan-17β-yl)formamide.

What is claimed is:

1. A compound of the formula

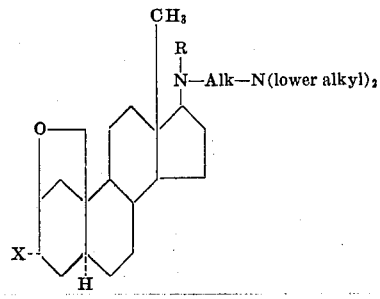

wherein R is selected from the group consisting of hydrogen and a formyl radical, Alk is a lower alkylene radical and X is a member of the class consisting of hydrogen, chloro and bromo.

2. As in claim 1, a compound of the formula

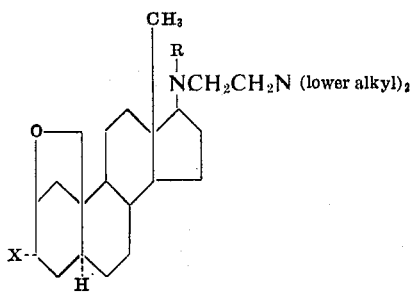

wherein R is selected from the group consisting of hydrogen and a formyl radical and X is a member of the class consisting of hydrogen, chloro and bromo.

3. As in claim 1, a compound of the formula

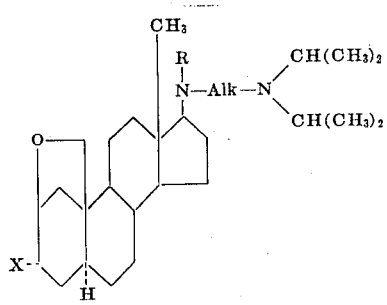

wherein R is selected from the group consisting of hydrogen and a formyl radical, Alk is a lower alkylene radical and X is a member of the class consisting of hydrogen, chloro and bromo.

4. As in claim 1, a compound of the formula

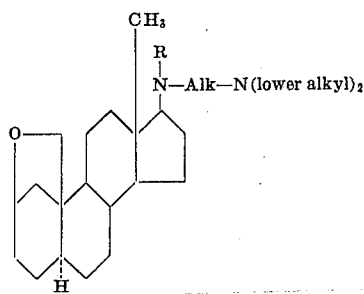

wherein R is selected from the group consisting of hydrogen and a formyl radical and Alk is a lower alkylene radical.

5. As in claim 1, a compound of the formula

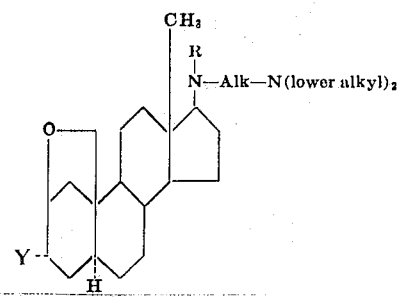

wherein R is selected from the group consisting of hydrogen and a formyl radical, Alk is a lower alkylene radical and Y is chloro or bromo.

6. As in claim 1, the compound which is N-(2-diisopropylaminoethyl)-N-(3α-chloro-2β,19-epoxy-5α-androstan-17β-yl)amine.

7. As in claim 1, the compound which is N-(2-diisopropylaminoethyl)-N-(2α,19-epoxy-5α-androstan-17β-yl)amine.

8. As in claim 1, the compound which is N-(2-diisopropylaminoethyl)-N-(2α,19-epoxy-5α-androstan-17β-yl)formamide.

9. As in claim 1, the compound which is N-(2-diisopropylaminoethyl)-N-(3α-chloro-2β,19-epoxy-5α-androstan-17β-yl)formamide.

* * * * *